Oct. 29, 1968

P. CHADENSON ETAL 3,407,656

APPARATUS FOR CONTINUOUS WEIGHING OF POWDERED OR
GRANULAR MATERIALS WITH WEIGHT
REGULATION OF THE FLOW

Filed Jan. 6, 1967

United States Patent Office 3,407,656
Patented Oct. 29, 1968

3,407,656
APPARATUS FOR CONTINUOUS WEIGHING OF POWDERED OR GRANULAR MATERIALS WITH WEIGHT REGULATION OF THE FLOW
Pierre Chadenson and Andre Lepeuve, La Tronche, France, assignors to Societe Generale de Constructions Electriques et Mecaniques (Alsthom), Paris, France, a corporation of France
Filed Jan. 6, 1967, Ser. No. 608,248
Claims priority, application France, Mar. 17, 1966, 4,899; Mar. 18, 1966, 4,900
6 Claims. (Cl. 73—194)

ABSTRACT OF THE DISCLOSURE

This invention relates to systems for measuring the weight rate of flow of pulverulent or granular materials from a storage bin by feeding the material onto a continuous conveyor pivoted at one end and having its other end resting on a weighing device; the invention accomplishing a more precise measurement of the weight rate of flow of the material by feeding the latter onto the conveyor at a place vertically above its pivotal axis and providing improved means for measuring the weight of the material on the conveyor, for measuring the speed of advance of the conveyor, and for controlling these measuring means to control the rate of feed of the material.

In systems of the indicated type, there is usually associated with the storage bin a suitable form of extractor for removing the material from the bin and dumping it onto the conveyor. The conveyor is usually a continuous belt stretched between two drums and mounted on a support which enables its discharge end to be tilted about a horizontal axis. In prior systems of this type, the discharge end of the conveyor rests on a weighing device and the outlet of the extractor is located substantially directly above the weighing device. Thus, the weighing and the adjustment of the flow of a material is effected on the basis of a measurement of the force exercised by the continuously laden conveyor on the weighing device. It has been found that this force is influenced by the momentum due to the fall of the material on the conveyor so that the readings of the weighing device comprise a margin of errors which has an effect on the precision of the determination of the rate of flow of the material and the regulation thereof.

In systems of the indicated type also, the measurement of the weight of the material delivered during a given period is generally effected by measuring, on the one hand, the speed of the belt in the form of an electric signal supplied by a measurement alternator rotated by the belt drive, and on the other hand, the force due to the weight of the material on the belt in the form of an electric signal supplied by an electric displacement detector arranged to determine the vertical displacement of the belt. The two signals are fed into an electrical energy detector capable of providing a signal which is a product of the speed and force which have been measured and proportioned to the weight rate of flow of the material. By integrating this product signal over a given period of time in accordance with known methods, there is obtained the value of the weight of material delivered by the conveyor during such period of time. For this integration, the art has used either purely electronic integrators of the resistor capacitor type, or D.C. electric motor integrators. The integrators of the first type are very expensive and fragile and are difficult to apply to industrial uses. The integrators of the second type are not of high precision, since the D.C. electric motor employed in such apparatus has too high an inertia and rubbing members (brushes).

The primary purpose of the instant invention is to provide an improved measuring system which does not have the above indicated disadvantages of known systems.

In accordance with the invention, the effect of the momentum of the material in the weighing device at the time of its delivery to the conveyor, is eliminated by discharging the material onto the conveyor at a place vertically above its pivotal axis.

In accordance with another aspect of the invention, there is employed as the integrating means a conventional alternating current motor having a speed proportional to the number of ampere turns in each coil and to the phase shift between the currents passing through such coils. One of the coils is fed directly by the alternator whose voltage is proportional to the speed of the belt, and the other coil is fed by the output of a displacement detector of the potentiometric type and whose signal represents the force due to the weight of the materials on the belt. This arrangement provides a measuring meter which is of low inertia and having no rubbing elements, which is simple and strong and can be utilized for industrial purposes, and which makes it possible to obtain a high precision of measurement of the order of 1%.

For a better understanding of the invention and other features and the advantages thereof, reference is made to the following detailed description which should be read in connection with the accompanying drawings, in which FIG. 1 is a plan view of a system embodying the invention for continuously weighing and regulating the rate of flow of materials;

Figure 1:
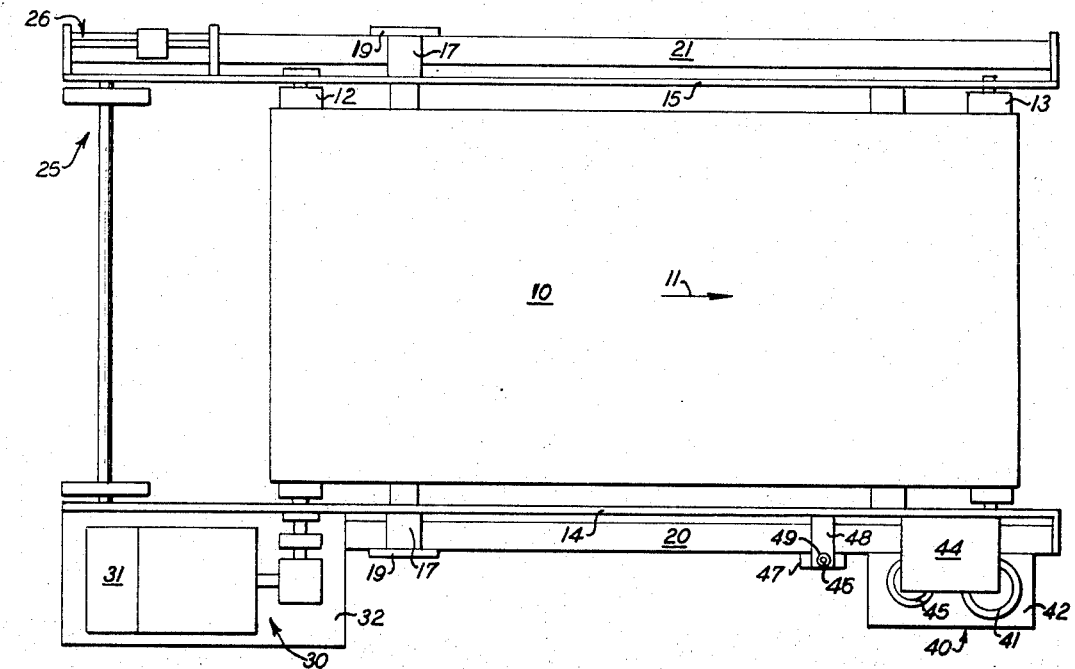
Figure 2:
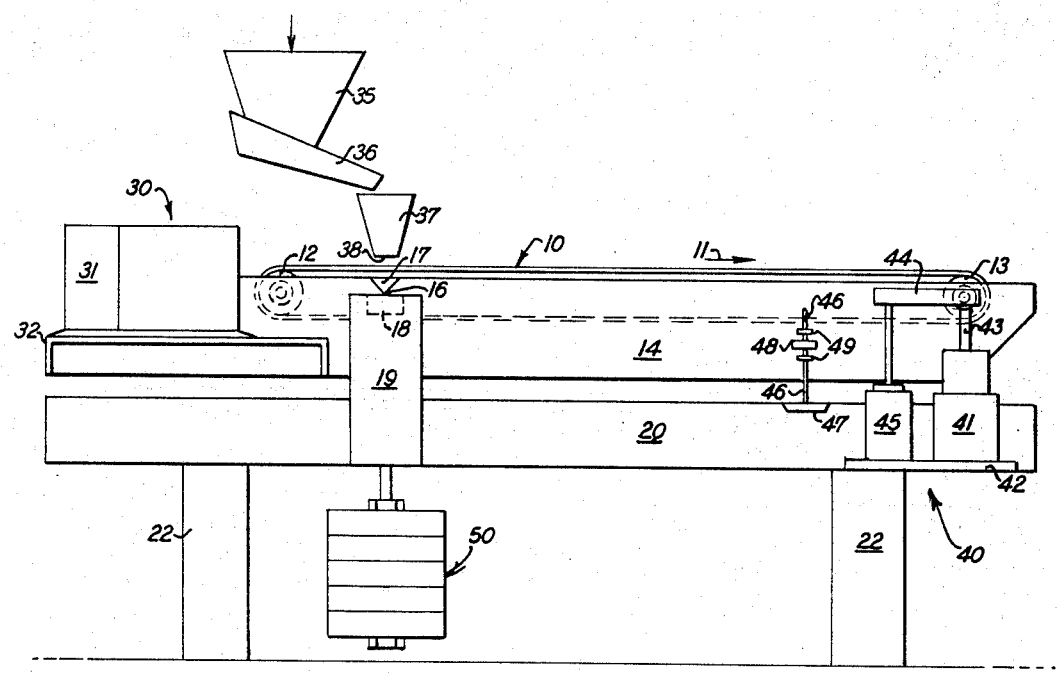
FIG. 2 is an elevational view of the parts shown in FIG. 1.

Referring more particularly to FIGS. 1 and 2 of the drawings, the numeral 10 indicates generally a conveyor belt moving in the direction of the arrow 11 and stretched between two rollers 12 and 13. The shafts of rollers 11 and 12 are mounted on the side members 14, 15 of a supporting frame which is mounted for pivotal movement about a horizontal axis 16. It will be noted that the roller 13 at the discharge end of the belt 10 is mounted on the side members 14, 15 on one side of the axis 16 and adjacent to one end of such side members and that the roller 12 is mounted on the other side of the axis 16, but substantially spaced from the other ends of such side members. The axis 16 of such frame is formed by the lower edges of two knives 17, 17 connected to the side members 14 and 15 of such frame and bearing on associated bearing blocks 18 provided at the upper ends of a pair of standards 19 secured to the side members 20, 21 of a main frame. The main frame is supported by legs 22 on the floor.

The assembly constituted of the belt 10, rollers 12 and 13, and the supporting frame having side members 14 and 15, is balanced with respect to the axis 16 by a tare 25 mounted on said other end of the side members 14, 15 and including a fine adjustment 26. The driving roller 12 is actuated by a driving group 30 of suitable construction as known to the art and comprising an electric tachometer measurement alternator 31 of known construction. The driving group 30 is mounted on a base 32 carried by the frame member 30 so that such driving group tilts with the supporting frame about the axis 16.

The materials whose rate of flow it is desired to regulate are contained in a bin 35 and are discharged therefrom by means of an extractor 36 of a known type into a hopper 37. The discharge orifice 38 is located vertically, directly above the axis 16 of the conveyor in order to enable the materials to drop from the hopper 37 onto the conveyor 10 without modifying the equilibrium of the assembly of which such conveyor forms a part. As previously indicated, the conveyor operates to feed the materials in the direction of the arrow 11 and toward the discharge end thereof at which is located the roller 13 and at which is provided weighing means that are indicated generally by the reference numeral 40. It will be understood that the balance of the assembly will be broken as soon as the materials move away from the pivotal axis 16 and that this imbalance will be accentuated as the materials approach the discharge end of the conveyor. An elementary charge of materials, therefore, will exert on the weighing means 40 a force which is zero at the time of its deposit on the belt 10 and which will increase linearly until its evacuation from the conveyor. This increasing concept of the load on the weighing means is a function of the length of travel of the materials and their speed of advance and this may readily be taken into account by the use of conventional electronic correction devices. It is sufficient to note continuously the readings of the weighing device, with due consideration of said invention, to know at any time the actual weight of the materials on the conveyor, and if one has means for measuring the speed of advance of the conveyor 10, one can, by forming the product, determine therefrom the actual weight rate of flow of the moving materials, the measurement of the weight having been made precisely by eliminating the momentum due to the falling of the materials on the conveyor.

As is indicated in FIGS. 1 and 2 of the drawings, the weighing means 40 comprise a displacement detector 41 of a known type, capable of giving off a signal as a function of the force exerted thereon by the conveyor belt 10 and the materials which it transports. This signal of the detector 41, for instance, a wound potentiometer, as has been previously explained, is suitably connected by known means to take into account the increasing action of the load on the apparatus as a function of the travel of the materials on the belt, and corresponds to the actual weight of the materials present on the belt at a given moment without deformation due to their falling on the belt.

The detector 41 is mounted on a bracket 42 secured to the fixed side member 20 of the main frame and is connected by a displacement member 43 to a horizontal plate 44 secured to the movable side member 14 of the supporting frame. The plate 44 is connected to the side member adjacent to and at the level of the shaft of roller 13 and the displacement member 43 is in a vertical plane containing such shaft. Also connected to the plate 44 is a dashpot 45 mounted on the bracket 42 and making it possible to suitably dampen the oscillations of the conveyor about its pivotal axis 16. A system of stops 45 provided on a vertical rod 46 standing on a plate 47 secured to the fixed side frame member 20 and coacting with an element 48 connected to the movable side frame member 14 limits the stroke of the conveyor to a small value. Located below the conveyor is a counterweight 50 which is fastened at its upper end to the conveyor directly above the knives 17. The counterweight 50 serves to create a return torque and to adjust the sensitivity of the conveyors oscillation. The pivoting conveyor as thus constructed constitutes a tangent balance. It is also within the contemplation of this invention to also utilize the pivotal movement of the conveyor to control a separate tangent balance for actuating the displacement detector 41. This construction has special advantages when the apparatus is employed to pass high rates of flow, since the mass of the counterweight can then be considerably reduced.

It will be understood from the foregoing that the combination of the signal from the detector 41 and of the signal from the electric tachometer 31 makes it possible to obtain a signal which enables a measurement of the weight rate of flow as a function solely of the speed of displacement and of the weight of the materials, all disturbing factors having been eliminated by the disclosed construction. The integrating by known electrical processes of the rate of flow signal thus obtained, makes it possible to obtain an indication of the weight which has passed over the belt during a given period of time, the device thus operating in this respect as a rate of flow totalizer. One can of course, then utilize the rate of flow signal to control the operation of the extractor 36 and thereby regulate the rate of flow of the materials to the belt.

Figure 3:
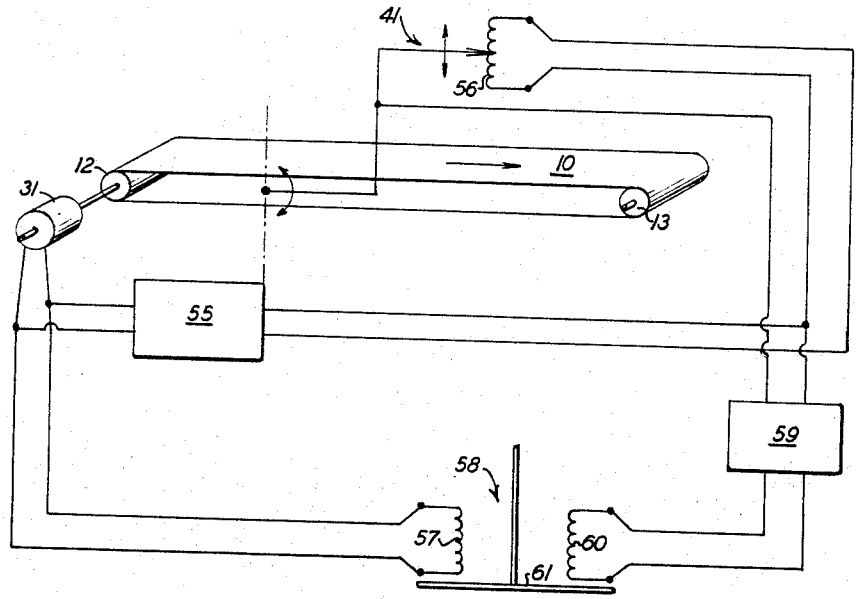
FIG. 3 is a diagrammatic view showing the manner in which the measurement alternator, the displacement detector and the integrating means are associated with the continuous belt.

As is shown in FIG. 3 of the drawings the integrating means in accordance with the invention may comprise a voltage stabilizer 55 with phase shift, or with constant phase shift. The signal from the measurement alternator 31 with permanent magnet, whose voltage is proportional to the speed of the belt 10 is injected, through the voltage stabilizer 55 into the coil of a potentiometer 56 constituting the vertical displacement detector 41 of the belt 10 under the effect of the load of materials which it transports.

The voltage signal emitted by the measurement alternator 31 is also injected into the voltage winding 57 of an A.C. motor 58 of the electrical energy measuring meter type.

The output of the measuring potentiometer 56 whose signal represents the force due to the weight of the materials on the belt 10, is connected via an impedance adaptor, if necessary, to the current winding 60 of the motor 58.

Under the aforesaid arrangement, where the potentiometer 56 of the displacement detector 41 is fed by the emission voltage of the speed measuring alternator 31, which voltage is further rendered constant by the voltage stabilizer 55, the two windings 57, 60 of the integration motor 58 are fed with constant phase shift. The rotor 61 of the integration motor 58 will under these conditions establish the product of speed $\times$ force $\times \cos \phi$. Now, the phase shift $\phi$ being constant between the currents coming from the speed and force signals feeding the two coils of the motor, the speed of rotation of its rotor 61 is proportional to the rate of flow and the number of turns of the rotor represents the weight delivered by the belt 10 during a given period of time. The number of revolutions of the rotor 61 of the motor 58 can be determined by any known means, for instance, by a photo-electric pickup without friction or inertia.

Figure 4:
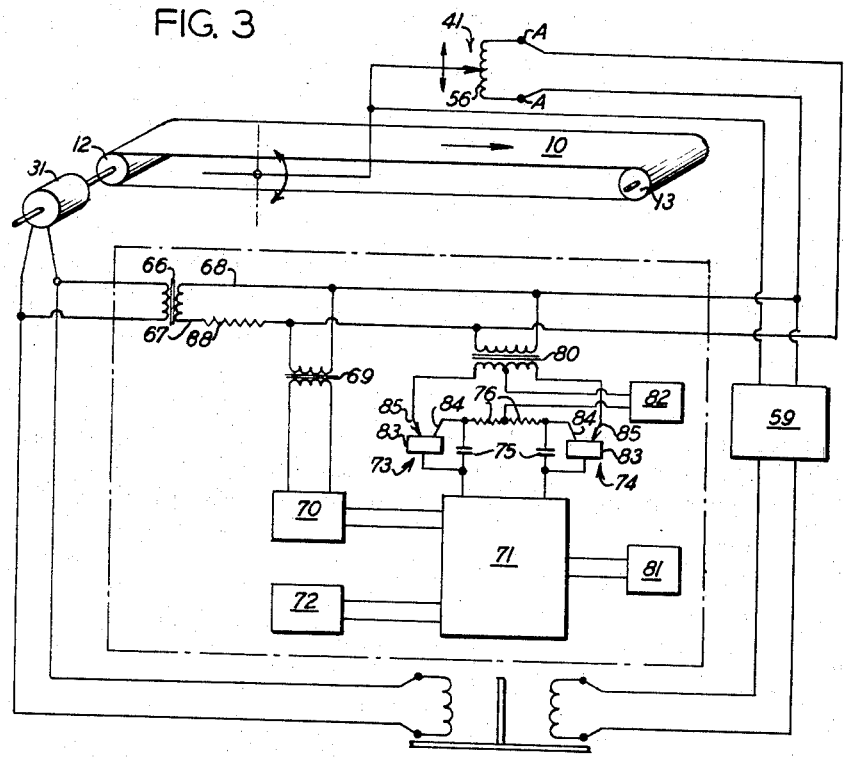
FIG. 4 is a view similar to FIG. 3 and shows the system provided with a voltage stabilization circuit to avoid phase shift.
Figure 5:
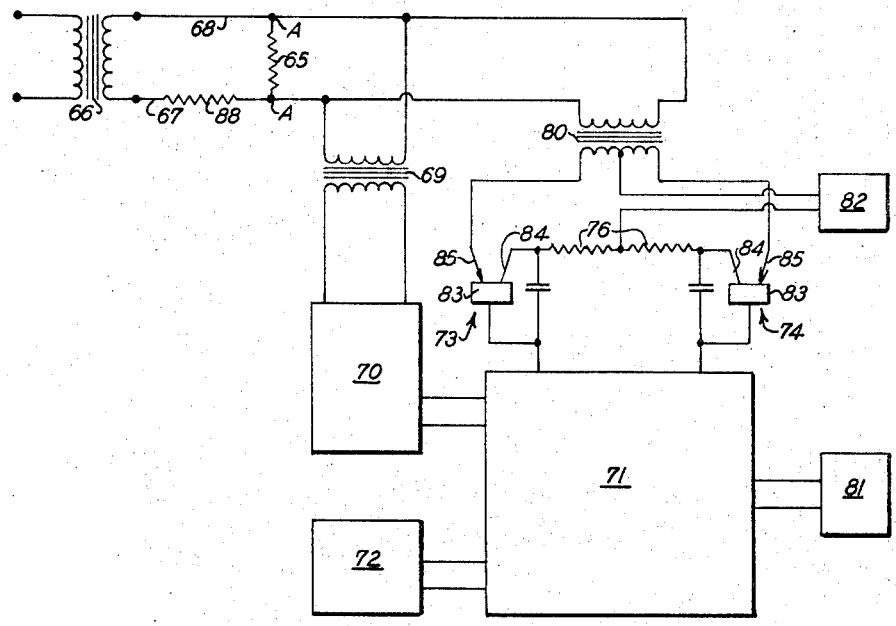
FIG. 5 is a diagram of a voltage stabilization circuit similar to that incorporated in the embodiment of FIG. 4.

FIGS. 4 and 5 of the drawings show a voltage stabilization circuit which makes it possible to maintain a constant voltage at the terminals A, A of the potentiometer 56 of the vertical displacement detector without phase shaft or harmonic distortions. In FIG. 5 of the drawings which shows the voltage stabilization circuit per se, the load in the circuit is represented by a resistor 65 instead of the potentiometer 56 for the sake of simplicity.

The voltage signal emitted by the measurement alternator 31 is fed through a transformer 66 into a low-power circuit composed of the electric inductors 67, 68 and the load or potentiometer 56. Connected to the terminals A, A of the load 56 is a transformer 69, the secondary voltage of which is rectified and filtered by means of an assembly 70 consisting of a diode bridge and a filter. The direct voltage obtained is passed through a differential amplifier 71 where it is compared with a reference voltage 72. The differential voltage resulting from such comparison is amplified and then applied to the bases of two transistors 73, 74 which are incorporated in a circuit comprising capacitors 75 and resistors 76.

The connection between the transistor circuit and the circuit 56 (65 in FIG. 5), 67 and 68 to be controlled, is effected via a transformer 80 having characteristics designed to avoid distortions and connected in parallel between the two circuits.

The amplifier 71 is fed by an auxiliary source of voltage 81 and the circuit of the transistors 73, 74 is fed by an auxiliary current source 82 which makes it possible to polarize the collectors of the transistors in such a manner that they operate on the linear portion of their characteristic curves.

It will be understood from the foregoing that when the alternating voltage to be regulated at the terminals of the load (56 in FIG. 4 and 65 in FIG. 5) increases, the voltage given off by the transformer 69 and, thereupon, by the filter-rectifier 70 increases proportionally. The differential amplifier 71 detects the difference between this voltage and the standard voltage 72 and amplifies it suitably so as to produce the desired stabilization differential voltage. The voltage at the output of the differential amplifier 71 modifies the polarization of the bases 83 of the control resistors 73, 74 so as to obtain a decrease of their internal resistance. This results in an increase in the collector 84-emitter 85 current and, therefore, an increase of the current in the primary winding of the coupling transformer 80 placed in parallel with the load circuit 56 (65), 67 and 68. The increase in current which flows from the primary winding of the transformer 80 has the effect of increasing the voltage drop at the terminals of a regulating resistor 88 located in series with the load circuit 56 (65), 67 and 68. The voltage at the terminals A, A of the load circuit is thus returned to its initial value with a precision which is a function of the amplification effected on the control circuit 69, 70, 71 and 80.

Figure 6:
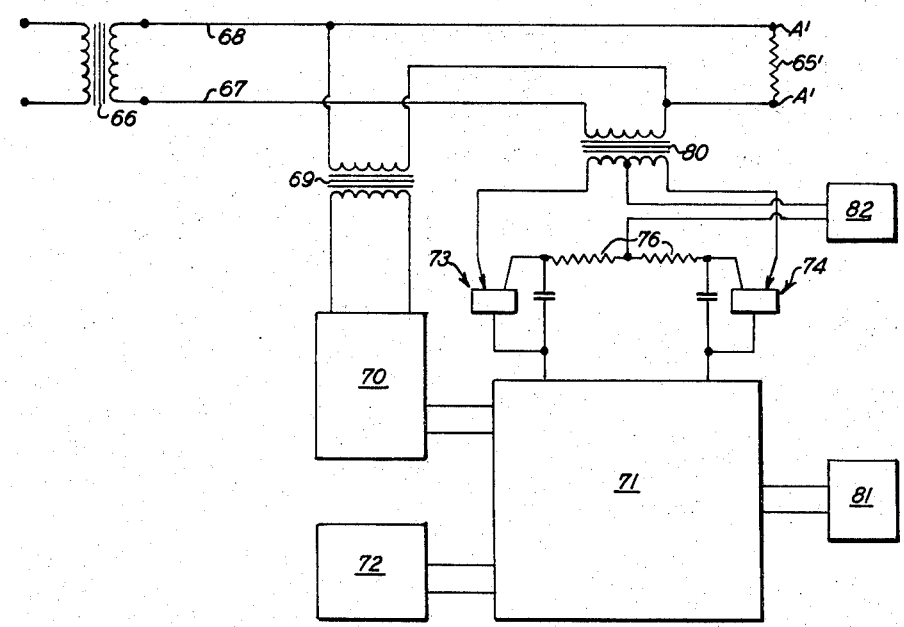
FIG. 6 is a diagram of another voltage stabilization circuit embodying the invention.

The circuit shown in FIG. 6 of the drawings differs from the circuit shown in FIGS. 4 and 5 in that the coupling transformer 80 is connected in series between the transistor circuit and the terminals A', A' of the load circuit 65' to be controlled.

The operation of the circuit of FIG. 6 is similar to that of the circuit of FIGS. 4 and 5, except that the transistors 73 and 74 producing the variable resistance in the circuit of FIG. 6 operate at constant intensity and at variable collector-emitter voltage, while in the circuit of FIGS. 4 and 5, such transistors operate at constant collector-emitter voltage and at variable intensity.

The regulating resistor 88 which is connected in series with the load circuit in the circuitry shown in FIGS. 4 and 5, is eliminated in the circuitry of FIG. 6, the voltage drop necessary for the balancing then taking place in the load circuit 65' connected in series with the coupling transformer 80.

While there has been hereinabove described and illustrated in the drawings, preferred embodiments of the invention, it will be evident that variations thereof may be made without departing from the spirit of the invention or the scope of the appended claims.

What is claimed is:

1. In apparatus for continuously feeding pulverulent or granular materials, a storage bin for the materials, an extractor connected to said bin, a continuous conveyor of the belt type, weighing means, means pivotally supporting said conveyor for movement about a horizontal axis and with one end thereof resting on said weighing means, means for measuring the speed of displacement of the conveyor, means associated with said extractor for depositing the extracted materials onto the conveyor vertically above its pivotal axis so as to continuously obtain a measurement of the weight of the materials from which has been eliminated the effect of the momentum of their fall on the conveyor and thereby making it possible to obtain a precise measurement of their weight rate of flow, and means to integrate the weight rate of flow to obtain the value of the weight delivered by the conveyor during a given period of time, said weighing means including a displacement detector of the potentiometer type whose signal represents the force due to the weight of the materials on the belt, said speed measuring means including an electric alternator whose voltage is proportional to the speed of the belt, and said integrating means including an A.C. motor having a speed proportional to the number of ampere turns in each coil and to the phase shift between the current traversing said coils, first means electrically connecting one of said integrator motor coils directly to said alternator, second means electrically connecting the other of said integrator motor coils to said displacement detector to be fed by the output of the potentiometer thereof, and third means electrically connecting said alternator to said displacement detector so that the latter is fed, in order to obtain a constant phase shift between the two coils of said motor, by the emission voltage of the speed measuring alternator, said third means including a voltage sabilizer without phase shift or with constant phase shift to make said emission voltage constant.

2. In apparatus as defined in claim 1, in which said third means electrically connecting said alternator to said displacement detector includes a low-power load circuit containing the variable resistor of said displacement detector, and a control circuit containing said voltage stabilizer, said load and control circuits being coupled together by a first transformer, said control circuit through said transformer regulating the alternating voltage feeding said load circuit without introducing phase shift and with a low amount of harmonic distortions.

3. In apparatus as defined in claim 2, in which said first transformer is connected in parallel between said circuits.

4. In apparatus as defined in claim 2, in which said first transformer is connected in series between said control circuit and the terminals of said variable resistor.

5. In apparatus as defined in claim 2, in which said control circuit includes a second transformer connected to the terminals of said variable resistor, a filter-rectifier for rectifying the secondary voltage of said second transformer, and a differential amplifier between said filter-rectifier and said first transformer.

6. In apparatus as defined in claim 5, in which said differential amplifier is connected to said first transformer through a transistor circuit.

References Cited

UNITED STATES PATENTS 1,125,705   1/1915   Messiter _____ 222—55 X
2,920,794   1/1960   Bauder et al. _____ 222—55 X ROBERT B. REEVES, *Primary Examiner.*

HADD S. LANE, *Assistant Examiner.*